Dec. 31, 1935.    G. H. NORTH    2,026,429
LAPPING MACHINE
Filed Sept. 30, 1932    3 Sheets-Sheet 1

Fig. 1.

INVENTOR.
George H. North
BY
ATTORNEY

Dec. 31, 1935. G. H. NORTH 2,026,429
LAPPING MACHINE
Filed Sept. 30, 1932 3 Sheets-Sheet 2

INVENTOR.
George H. North
BY Clayton L. Jenks
ATTORNEY

Dec. 31, 1935. G. H. NORTH 2,026,429
LAPPING MACHINE
Filed Sept. 30, 1932 3 Sheets-Sheet 3
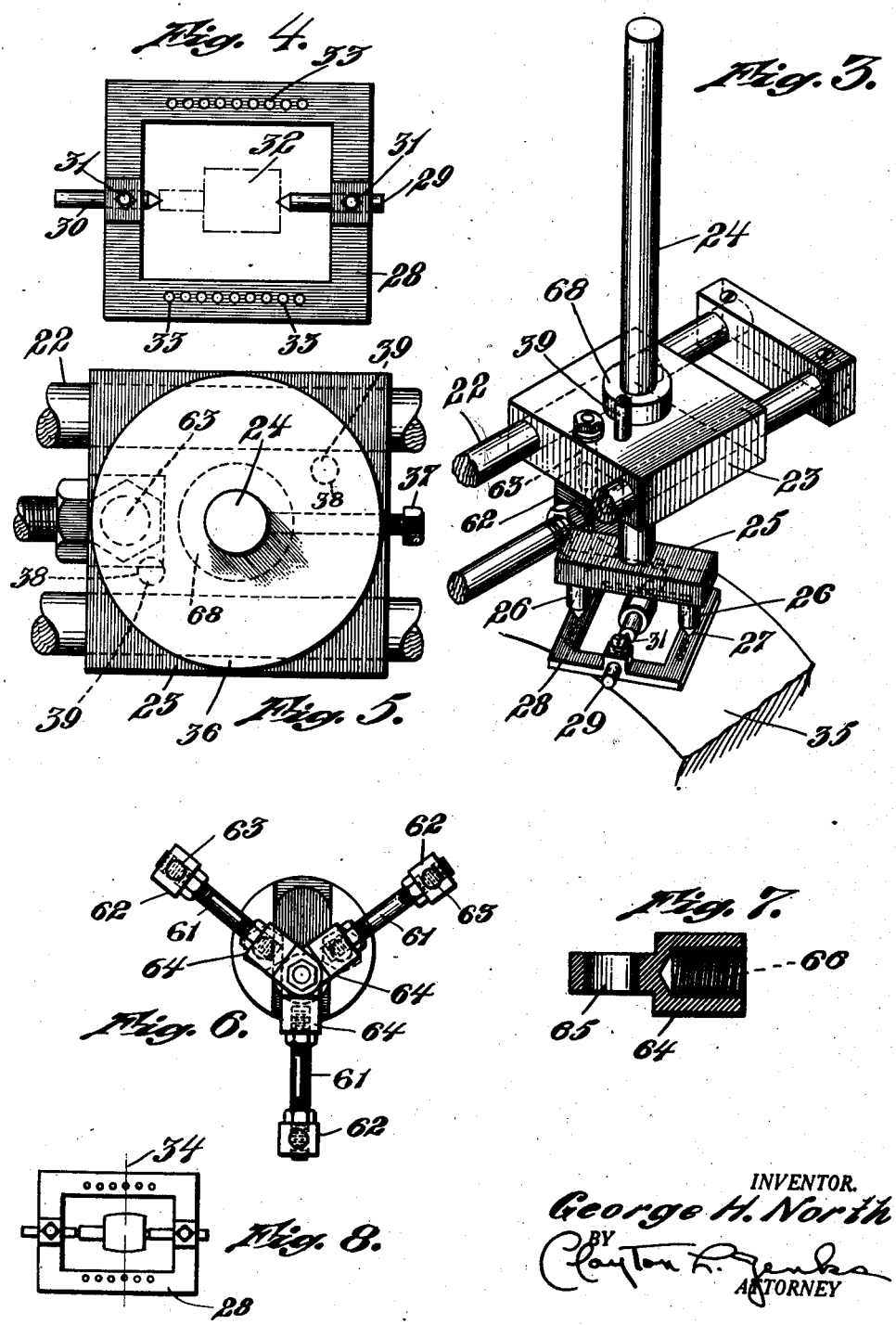

Patented Dec. 31, 1935

2,026,429

UNITED STATES PATENT OFFICE 2,026,429

LAPPING MACHINE

George H. North, Cranston, R. I., assignor to Norton Company, Worcester, Mass., a corporation of Massachusetts Application September 30, 1932, Serial No. 635,558

14 Claims. (Cl. 51—122)

This invention relates to a lapping machine and has for one of its objects to provide a machine in which one single parcel of work may be lapped to the size desired without the necessity of lapping other parcels of work to the same size.

Another object of the invention is the provision of a machine in which parcels of work of different sizes may be lapped at the same time.

Another object of the invention is the provision of a machine in which the point of application of pressure to the work may be varied so that when work placed in the machine is of an uneven diameter throughout its length, pressure may be so located as to be first applied at the greatest diameter that this may be more quickly reduced to the size of the remaining portions of the work.

Another object of the invention is the provision of a machine in which the pressure on each individual parcel of work may be varied.

A further object of the invention is the provision of a machine in which the weight or pressure may be applied to a holder for the work rather than on the work itself that adjustments with relation to the point of pressure may be more accurately determined.

A still further object of the invention is the provision of a machine in which the skid angle of the work may be adjusted without the removal and replacement of any of the parts.

With these and other objects in view, the invention consists of certain novel features of construction, as will be more fully described, and particularly pointed out in the appended claims.

In the accompanying drawings:—

Fig. 1 is a side elevation partly in section of the lapping machine.

Fig. 3 is a perspective view of a detail of the work guiding means.

Fig. 4 is a top plan view of the work holder showing the work in broken lines as positioned therein.

Fig. 5 is a top plan view of the carriage which slides along the guides in controlling the movement of the work.

Fig. 6 is a top plan view of the link connections radiating from the eccentric shaft which reciprocate the carriage shown in Fig. 5.

Fig. 7 is a sectional view of the member mounted on the eccentric shaft to which the links are connected.

Fig. 8 is a top plan view of the work holder showing somewhat diametrically a bulging form of a line passing through the point of largest diameter at which the pressure would be applied to the carriage.

Figure 2:
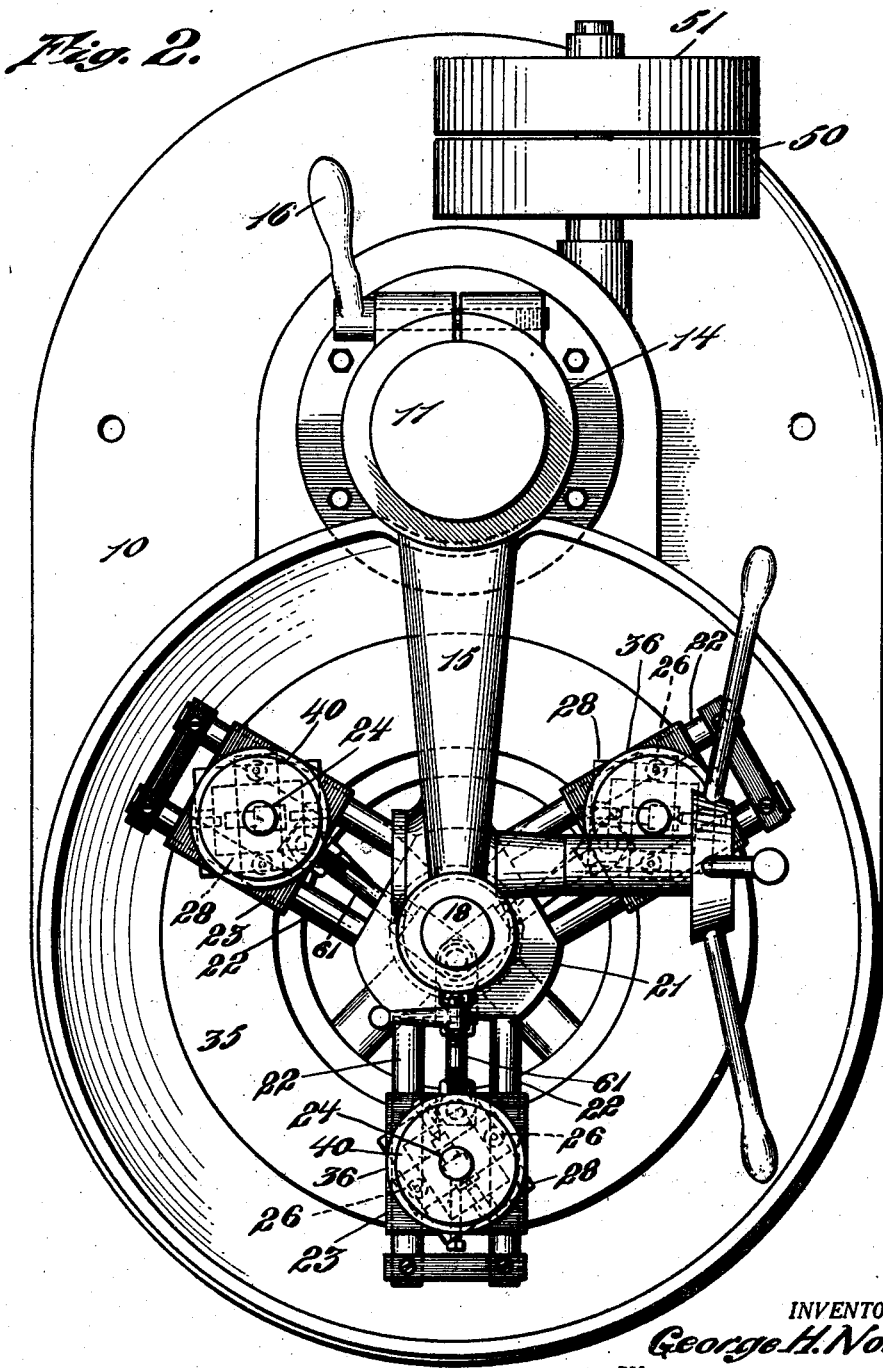
Fig. 2 is a top plan view thereof.

Lapping machines which are in use today for the lapping of limit gages require that at least three gages be lapped in a circular machine in order that a true and accurate shape may be obtained. Occcasionally, it so happens that a single gage of an odd size is required to be lapped, which cannot be accomplished economically as three gages must be lapped in order to obtain the correct single odd size gage. Further, in the old type it is necessary to vary the same for each size gage and two gages of different sizes cannot be lapped on the same machine; and to avoid these disadvantages, I have provided a machine in which one individual gage may be lapped, or several gages each of different diameters may be lapped, and in constructing such a machine I have also provided an arrangement by which the location of the application of pressure may be so adjusted that the point of largest diameter along the axial length of the gage will receive the pressure that this larger diameter will wear down quicker than the remaining portions, whereby the gage may be more quickly lapped; and I have also provided a construction in which the skid angle, or the angle which the line of abrading contact of the work on the lap bears to an engaging radius of the circular lap, may be adjusted to the desired degree; and the following is a detailed description of the present embodiment of this invention illustrating the preferred means by which these advantageous results may be accomplished.

With reference to the drawings, 10 designates the frame or base of the lapping machine upon which a post 11 is mounted to project vertically upwardly. A collar 12 encircles the post which may be clamped in any desired vertical position by the clamp 13 to support hub 14 of the arm 15 which may also be clamped in desired position by the clamps 16 provided thereon. The arm 15 is provided with a sleeve 17 at its end within which there is slidably mounted a rack bar 18 provided with rack teeth 19 thereon which may be engaged by a pinion, not shown, and moved to desired position of vertical adjustment by the mechanism designated generally 20.

At the lower end of this bar 18 I have provided a spider consisting of a hub 21 with a plurality of radiating pairs of guides 22, upon which there is slidably mounted a carriage 23 with a circular opening therethrough provided with a bushing 68 for slidably receiving the rod or shaft 24, upon the lower end of which there is mounted a saddle 25 having fingers 26 extending downwardly therefrom with conical ends 27.

A work holder or cradle 28 is in the form of an open square and is provided with centers 29 and 30 adjustably mounted at diametrically opposite points by means of set screws 31. These centers extend into suitably recessed ends in the center of the work 32 to rotatably support the work in the cradle. Spaced recesses 33 are provided along the opposite sides of the cradle and are shaped to fit the conical pointed ends 27 of the fingers 26. These fingers may fit any pair of opposite openings 33 in the cradle and are positioned in the pair of opposite openings corresponding to the location of largest diameter of the work, as designated by the line 34 shown in Fig. 8, where a bulging or barrel shaped portion of the work is to be reduced to a desired cylindrical shape and size. By this arrangement pressure is applied to the work at the desired point forcing the work against the lap 35.

A collar 36 is provided on the shaft 24 and is spaced above the carriage 23 and held in the desired position of vertical height above the carriage by the set screw 37 which also prevents relative movement of the shaft and collar. This collar is provided with openings 38 to receive pins 39 preventing the collar from rotating with reference to the carriage and also thus preventing the work holder from rotating and providing a means of adjustment to align the axis of the work as desired with reference to the radius of the lap 35 and thus providing the desired inclination, or that which is commonly called the skid angle of the work, as the lap moves with relation to it.

Weights 40 are shown as circular in shape and are provided with an opening to receive the shaft 24 and rest upon the collar 36 to provide the desired pressure upon the work. This weight is so arranged that its center of gravity is vertically above the work and passes therethrough.

The rotatable lap 35 is mounted on a hub or flange 41 which is connected to the tubular shaft 42 rotatable in upper and lower fixed bearings 43 and 44 secured in the frame 10. A worm wheel 45 is fixed to the tubular shaft and is engaged by worm 46 on the drive shaft 47 which is supported in the fixed bearings 48 and 49 in the frame and which is provided with tight and loose pulleys 50 and 51. A shaft 52 extends through the hollow tubular shaft 42 and is driven by means of the gear 53 on the tubular shaft, pinions 54 and 55 on the stub shaft 56 and gear 57 on the shaft 52. This shaft 52 is provided at its upper end with a disc 58 upon which there is eccentrically mounted a pin 59 slidable radially of the disc in suitable guideways and secured in position by a set screw 60.

The carriages 23 are connected to this eccentric pin 59 by means of links 61 consisting of rods threaded into swivel blocks 62 mounted upon a swivel pin 63 on the carriage and at the other end the link is provided with a member 64 having an opening 65 to receive the pin 59 therethrough and is threaded as at 66 to receive an end of the rod to comprise a swively connected link and one which causes the carriages with the weights, work holder and the like mounted on the carriage to move inwardly and outwardly radially of the lap as the parts rotate. Hence, it will be apparent that the simultaneous rotation of lap 35 and the gyration of the work pieces 28, caused by the eccentric rotation of pin 59, will serve to simultaneously move each of the work pieces through an everchanging path during the lapping operation. The eccentricity of the path of work movement may be regulated by adjusting screw 60 and links 61.

By this arrangement any desired number of different sized parcels of work may be lapped at one time, with varying amounts of pressure or a single parcel of work may be equally well lapped where an odd size is desired.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A lapping machine comprising a rotatable lap, means to rotate the lap, a work holder for holding the lines of abrading contact of a plurality of cylindrical work pieces fixed angularly relative to a radial line on the lap, mechanism for moving and individually guiding the peripheral surfaces of the work pieces associated therewith relative to said lap and in abrading engagement therewith, and means for individually regulating the pressure of each work piece engaging the lap.

2. A lapping machine comprising a rotatable lap, means to rotate the lap, a work holder for angularly positioning the lines of abrading contact of each one of a plurality of round work pieces relative to a radial line on the lap, means for individually adjusting said angular relation whereby the skid angle between the work pieces and the lap may be varied, mechanism for moving and individually guiding the peripheral work surfaces relative to the lap and in abrading contact therewith, and means for individually regulating the pressure of each work piece engaging the lap.

3. In a lapping machine, a lap, means for simultaneously lapping a plurality of work pieces of different sizes including separate means for weighting each of the work pieces, separate means for moving and guiding each work piece with reference to said lap, and means for regulating the angular relation of the line of abrading contact of each work piece relative to a lap radius.

4. A lapping machine comprising a rotatable lap having a flat lapping surface, a plurality of work holders arranged to simultaneously guide cylindrical work pieces of different sizes in peripheral engagement with the lapping surface, means providing an eccentric movement for each work holder relative to the lap to cause a lapping operation, means to individually regulate the extent of eccentric movement of each work piece, and means to individually adjust the skid angle of each work piece between its line of lapping contact and a lap radius.

5. A lapping machine comprising a lap having a flat abrading face, means for simultaneously moving and individually guiding a plurality of separate round work pieces of different sizes through ever-changing paths relative to the lap to simultaneously finish the work pieces, and means for individually adjusting the work holders irrespective of each other and varying the angles between each line of lapping contact and a fixed line on the lap.

6. In a lapping machine, a lap, a plurality of work holders, means for relatively moving said lap and work holders, and means to separately apply different pressures on each work holder to force the work carried thereby toward said lap, and cooperating means between said pressure applying means and said work holder to selectively vary the point of application of pressure with reference to each work piece.

7. In a lapping machine, a lap, a work holder, means for relatively moving said lap and work holder, means to apply pressure on the work holder to force the work carried thereby toward said lap, and means comprising spaced pairs of sockets in said holder and fingers provided on said pressure applying means to selectively engage said holder and through which said pressure is applied.

8. In a lapping machine, an annular lap, means for rotating said lap, a plurality of radial work supports, means for moving and guiding separate parcels of the work radially thereon with reference to said lap, means for individually and adjustably weighting each parcel of work, and means for angularly positioning the line of abrading contact of each work piece relative to a lap radius.

9. In a lapping machine, a circular lap, means for rotating said lap about its center, a radial guide, a carriage on said guide, means eccentrically mounted with reference to said center to move said carriage along said guide, a work holder provided on said carriage and extending in close proximity to said lap, and means to exert variable pressures upon selective portions of said work holder.

10. In a lapping machine, a circular lap, means for rotating said lap about its axis, a plurality of radial guides, a carriage on each of said guides, means eccentrically mounted with reference to said axis to simultaneously move said carriages along said guides, a work holder beneath each carriage and means extending from each of said work holders to each of said carriages to control the movement of said work holders.

11. In a lapping machine, a circular lap, means for rotating said lap about its axis, a plurality of radial guides, a carriage on each of said guides, means eccentrically mounted with reference to said axis to move said carriages along said guides, a work holder beneath each carriage, a rod extending from each of said work holders to each of said carriages to control the movement of said work holders, and weighting means on each of said rods to force said work holders toward said lap with unrelated pressures, and means to angularly position said rods to vary the angular relation of that portion of the work engaging the laps relative to a lap radius.

12. In a lapping machine, a circular lap, means for rotating said lap about a center within itself, a pin eccentrically mounted with reference to said center, a guide arranged radially with reference to said center, a carriage on said guide, a link connecting said carriage to said pin to move the carriage radially with reference to said center, a work holder, a shaft slidably mounted in said carriage and provided with means straddling said work and engaging said work holder and weights on said shaft for forcing said work holder toward said lap.

13. In a lapping machine, a circular lap, means for rotating said lap about its axial center, a pin eccentrically mounted with reference to said center, means for revolving said pin about said axial center, a spider coaxial with said center and a plurality of radial guideways thereon, a carriage slidable on each of said guideways, a link connecting each carriage to said pin for radial movement along said guideways, each of said carriages having a bearing opening, a rod through each of said bearing openings, a work holder beneath each rod, a saddle on each rod engaging its work holder and weights on each rod for forcing the work holder and work therein toward said lap.

14. In a lapping machine, a circular lap, means for rotating said lap about its axial center, a pin eccentrically mounted with reference to said center, means for revolving said pin about said axial center, a spider co-axial with said center and a plurality of guideways therein, a carriage slidable on each of said guideways, a link connecting each carriage to said pin for radial movement along said guideways, each of said carriages having a bearing opening, a rod through each of said bearing openings, a work holder beneath each rod, a saddle on each rod engaging its work holder and a collar on each of said rods above said carriage, and a plurality of annular weights receiving said rods with the lower one of each group resting on said collar for forcing the work holder and the work contained therein toward said lap.

GEORGE H. NORTH.